Feb. 21, 1928.
W. H. SMYTH
1,660,102
HIGH SPEED TRACKLAYING TRACTOR
Filed June 4, 1923
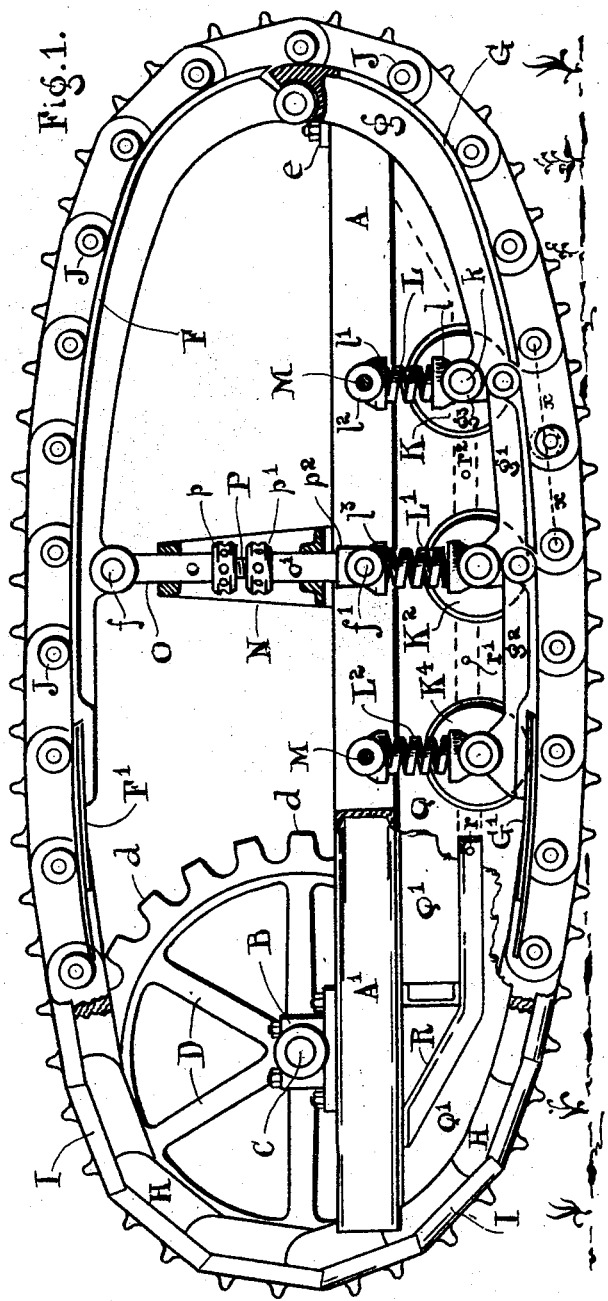
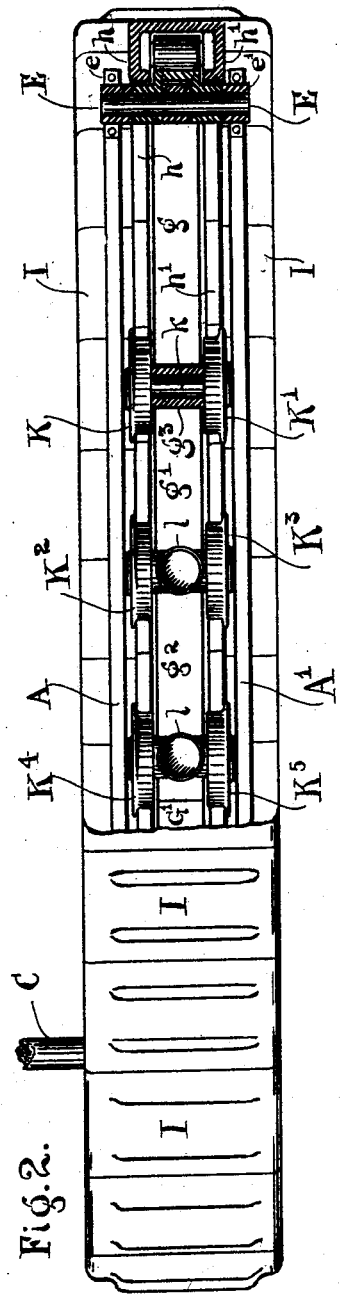
WITNESSES
INVENTOR
William H. Smyth Patented Feb. 21, 1928.

1,660,102

UNITED STATES PATENT OFFICE.

WILLIAM H. SMYTH, OF BERKELEY, CALIFORNIA.

HIGH-SPEED TRACKLAYING TRACTOR.

Application filed June 4, 1923. Serial No. 643,257.

This invention relates to self-laying-track vehicles. It has for its object to provide a track assembly, in this type of vehicle, that will permit of higher speed of travel than is practicable under the present practice and construction; and, incidental to this object, to provide means whereby the track conforms to varying ground contours while maintaining a constant evenly distributed resilient tension on the track-chain automatically responsive to changes in surface contour and load conditions; and to effectively cushion the machine under these changing conditions and thereby reduce wear and upkeep; and to accomplish these objects with few and simple parts, easy to assemble or replace.

A typical expression of my invention that accomplishes these objects is shown in the accompanying drawing wherein:

Fig. 1 is a side elevation of the track assembly, portions broken away for better illustration.

Fig. 2 is a plan view, with portions broken away and parts in section.

A track-lying-tractor is essentially a travelling cog-railway which carries and spikes down its own cogged-track as it progresses. This important fact has, seemingly, not heretofore been effectively recognized in the construction of self-laying-track vehicles, hence unnecessarily severe strains have been imposed on parts inherently ill-adapted to withstand them. This is especially true of the track, both in its upper and lower stretches, but particularly so as regards the ground-contact load-supporting part of the chain-track.

The construction illustrated in the drawing and hereinafter described, conforms to portable cog-railway conditions by providing means appropriate to its requirements.

As the track assembly alone distinguishes the track-laying type from the "round-wheeler" form of motor vehicle, the motor element and its framework being common to both types and the construction of these parts being within the knowledge of mechanics skilled in the art, I will confine my description to those parts of the tractor structure directly affected by my invention. But, in what follows, it is to be understood that the sprocketed power-wheel, with its journal-box and frame are intended to represent not alone a power-wheel but also, for the purposes of this disclosure, the motor element complete with any suitable rigid, flexible, or resilient connections between the power element and the track-assemblies.

With this understanding, $A$—$A^1$ represent framework pertaining to a self-laying-track vehicle. It carries journal-box B, and shaft C, power-wheel D, with its circumferential teeth or sprockets $d$—$d$.

Upon the frame, near the opposite end from the power-wheel is a strong hinge-pin E, transverse of the frame members $A$—$A^1$, to which it is attached by any suitable means, indicated in the drawing by boxes $e$—$e^1$ in which the hinge-pin is secured. On the pin E is hinged a curved upper guide-rail F, and also a curved lower guide-rail G. The guide-rails F, and G, extend rearwardly from their hinge connection towards and close to the sprocket-wheel D, like the hinge members of a caliper about to caliper the sprocket-wheel. The guide-rails F, and G, thus constitute with the sprocket-wheel D, an oval substantially continuous guide-way.

Trained around the oval guide-way is an endless track-layer chain H. It is formed of links provided with tread-shoes I—I, adapted to afford a relatively wide ground-bearing support for the machine. The links of the chain are preferably formed of parallel members $h$—$h^1$ thus constituting an endless ground-bearing double-track-rail, adapted to support the weight of the machine. On the links of the chain H, intermediate of its track-surface and ground-contact-surface are journaled antifriction rollers J—J, adapted to roll upon the guide-rails F and G, and coact with the teeth of the sprocket-wheel D.

The guide-rail G is divided into hinged sections $g$—$g^1$—$g^2$, as shown in Fig. 1. The section $g$ at its forward end is pivoted on the pin E as already stated, each section being successively hinged to the preceding section. Adjacent to its rear end and secured on the section $g$ is a box or bearing $g^3$. In this box is journaled the axle $k$, of track wheels K—$K^1$. The wheels K—$K^1$ are travelable upon the tracks $h$—$h^1$, respectively.

Upon the box $g^3$, is a cup or socket $l$, for the reception of a spring L; the upper end of this spring abuts in a socket $l^1$, and attached to this socket is a transversely perforated boss $l^2$, and traversing the boss is a bolt M, extending between the frame members A—A¹, for which the bolt M constitutes a connecting strut.

The rail sections $g^1$—$g^2$ are also provided with spring-pressed track-wheels as shown in Fig. 1 and are substantially similar to section $g$, except as has been and will be later noted, and indicated in the drawing.

The guide-rail F is preferably provided, at its rearward end, with a leaf-spring F¹, and section $g^2$ of guide-rail G is similarly provided, as shown at G¹, Fig. 1.

Connected with the guide-rail F at $f$, is a downwardly extending turnbuckle link O, its lower end being connected at $f^1$, with the socket $l^3$, which socket forms an abutment for the spring L of the wheels K²—K³. The hinge-pin $f^1$, unlike the strut-bolts M—M, is independent of the frame A—A¹, and is thus free to respond to the action of spring L, up to a shoulder or limiting abutment $p^2$, on $o^1$. The link O, is guided in a bracket N, mounted on the framework of the machine, and is preferably formed in two parts $o$—$o^1$. An adjusting screw P, connects the two parts $o$—$o^1$ of the link O, and is provided with a turning boss $p$, and lock-nut $p^1$.

Secured to the frame A—A¹ and lengthwise thereof is a depending mud-guard, one on each side of the track-assembly, as shown at Q—Q¹, Fig. 1 with a laterally stiffening frame R, for each of the mud-guards. Struts may connect the frames R, for extra stiffness, such for example as bolts $r$, $r^1$, $r^2$, extending across from mud-guard to mud-guard.

Under normal conditions of operation, the curved ground-contact of chain H, between the peripheries of the track-wheel pairs, K—K¹, and K⁴—K⁵, tends to flatten in conformity with the level ground surface. Such flattening tends to slack the chain. This slack is, simultaneously taken up by link O, raising the hinged guide-rail F, under resilient pressure of the spring L¹.

The axle-united pairs of track-wheels K—K¹, K²—K³, K⁴—K⁵, being wheel-units each wheel-unit is separately spring-pressed, and responds as a unit independently and separately conforms to changing surface contour. In so doing they cause the hinged guide-rail G, to correspondingly conform to the ground surface undulations, through the flexing of its sections $g$, $g^1$, and $g^2$, on their hinges. But while the track-chain H, conforms to the ground undulations, it is prevented from buckling or kinking between the peripheries of the load-bearing track-wheels, by the antifriction rollers J, J. It will be observed in Fig. 1 that the antifriction rollers do not contact with the guide-rail G, beneath the track-wheels K—K²—K⁴; thus they are relieved of load-bearing duty. The function of the rollers in the ground run of the chain is only antifriction and the prevention of useful and destructive chain-flexure between the peripheries of the load-bearing wheels. This is indicated at $x$—$x$, Fig. 1 by the dotted circle and radius lines.

In the upper run, the rollers J—J, act as antifriction supports for the chain H, and there being a roller for each link the stress of tensioning the chain is widely distributed, thus reducing to negligibility the duty imposed on the individual roller, while keeping the chain on a smoothly curved track and uniform tension throughout.

By means of the screw P, of link O, the amount of resilient tension on chain H, may be adjusted to any desired degree. By the co-action of link O, and the load-bearing spring L¹, the operation of the guide-rail F, and upper run of chain H, is made responsive to the varying necessities of surface undulations and conditions, in taking up or providing tensioned slack in the ground-run of chain H.

The leaf-springs F¹, and G¹, by their smooth and silent cushioned engagement with the antifriction rollers J, J, eliminate the customary noisy and violent pounding of the chain as it engages and leaves the power-wheel.

Being reinforced and stiffened by the frame R, the mud-guards Q, Q¹, in addition to their dirt-excluding function, serve as guides for the track-wheels K—K¹, K²—K³, and K⁴—K⁵, to prevent their displacement by side thrust incident to maneuvering the tractor.

By the constructions and provisions described, all the load-bearing parts of a track-laying vehicle are made flexibly and resiliently conformable to ground contours, with the result of maintaining tractive surface contact with the ground regardless of its constantly changing contour. And the load-bearing wheels are always traveling upon a track of maximum smoothness by the bridging of the gap between the peripheries of the load-bearing wheels by the hinged sections of guide-rail G. These constructions and provisions thus unify in one structure elements adapted to permit of high speed with minimum wear, upkeep expense, friction losses and power wastage, which is the main object of this invention.

I do not desire to be limited to the particular expressions of my invention used herein for illustrative purposes, nor to be limited in any other way than in accord with a liberal interpretation and the reasonable purport of the claims which follow and I claim:

1. A vehicle comprising a frame, an endless chain-track with antifriction guide-rollers journaled thereon intermediate of its track-surface and ground-contact-surface adapted to constitute therewith a roller-guideway, a plurality of wheel-units travelable upon the track each unit being curvilinearly movable independently of each other and a separately pivoted member on which each wheel-unit is mounted.

2. A vehicle comprising a frame, an endless chain-track with antifriction guide-rollers journaled thereon intermediate of its track-surface and ground-contact-surface adapted to constitute therewith a roller-guideway a plurality of curvilinearly movable spring-pressed frame-support wheel-units travelable upon the track-rail-surface and a separately pivoted member on which each wheel-unit axle is journaled.

3. A vehicle comprising a frame, an endless chain-track with antifriction guide-rollers journaled thereon intermediate of its track-surface and ground-contact-surface adapted to constitute therewith a roller-guideway, a plurality of concentric pairs of curvilinearly movable support-wheels travelable upon the track-rail-surface and a separately pivoted member on which each wheel pair is journaled.

4. In a tractor an endless-chain track adapted to ground support, an adjustable support for the upper run intermediate of its end bights, and means actuated by the ground run of the chain adapted to raise and lower the upper run chain support.

5. In a tractor an endless-chain track adapted to ground support, an adjustable guide rail for the upper run of the track, a support wheel travelable upon the ground run of the chain track, and means actuated by the vertical movement of the wheel adapted to raise and lower the guide rail.

6. In a tractor an endless-chain track adapted to ground support, an adjustable rail for the upper run of the track, a wheel travelable upon the ground run, and a spring actuated by the vertical movement of the wheel abutting on the ground run and on the rail.

7. In a tractor a frame and endless-chain track adapted to ground support, a guide-rail contacting with the ground run of the chain track the rail being formed of sections hinged together, and support wheels travelable upon the track journaled on the sections.

8. In a tractor a frame, an endless-chain track adapted to ground support, a rail contacting with the ground run of the track the rail being formed of sections hinged together, a pair of support wheels journaled on and transversely of the sections adjacent to each hinge, and a spring for each wheel pair to independently oppose its upward movement.

9. In a tractor an endless-chain track adapted to ground support, hinged sections forming a guide-rail paralleling its ground run, support wheels travelable upon the chain track journaled on the hinged sections, and antifriction rollers journaled on the chain-track co-acting with the guide-rail to limit the flexure of the ground run of the track.

10. In a tractor an endless-chain track adapted to ground support, hinged sections forming a guide rail paralleling its ground run, a spring opposed track wheel journaled on each of the sections, and antifriction rollers on the chain track co-acting with the guide-rail to limit the flexure of the ground run of the track.

In testimony whereof I hereunto affix my signature.

WILLIAM H. SMYTH.